United States Patent [19]

Olson et al.

[11] Patent Number: 4,663,024

[45] Date of Patent: May 5, 1987

[54] PROCESS FOR CATALYTIC CONVERSION OF HYDROCARBON FEEDSTOCK

[75] Inventors: Paul B. Olson; Richard M. Minday; Julian B. Cooley, all of St. Paul, Minn.

[73] Assignee: Minnesota Mining and Manufacturing Company, St. Paul, Minn.

[21] Appl. No.: 815,667

[22] Filed: Dec. 31, 1985

Related U.S. Application Data

[60] Continuation of Ser. No. 683,699, Dec. 19, 1984, abandoned, which is a division of Ser. No. 489,256, Apr. 27, 1983, Pat. No. 4,546,090.

[51] Int. Cl.$^4$ .............................................. C10G 11/05
[52] U.S. Cl. .................................................. 208/120
[58] Field of Search .......................................... 208/120

[56] References Cited

U.S. PATENT DOCUMENTS

| | | | |
|---|---|---|---|
| 3,468,815 | 9/1969 | Cole et al. | 208/120 |
| 3,650,988 | 3/1972 | Magee et al. | 252/451 |
| 4,039,480 | 8/1977 | Watson et al. | 252/455 |
| 4,097,410 | 6/1978 | Gladrow | 252/455 |
| 4,148,713 | 4/1979 | Rouman | 502/69 |
| 4,170,569 | 10/1979 | Herrington et al. | 252/448 |
| 4,214,978 | 7/1980 | Kennedy et al. | 206/120 |
| 4,260,524 | 4/1981 | Yamada et al. | 502/527 |
| 4,441,990 | 4/1984 | Huang | 208/120 |
| 4,448,599 | 5/1984 | Mackenzie et al. | 65/21.4 |
| 4,546,090 | 10/1985 | Olson et al. | 502/69 |

OTHER PUBLICATIONS

J. A. Rabo, Zeolite Chemistry and Catalysis, American Chemical Society, (1976), (pp. 615-630).

*Primary Examiner*—Andrew H. Metz
*Assistant Examiner*—Anthony McFarlane
*Attorney, Agent, or Firm*—Donald M. Sell; James A. Smith; David L. Weinstein

[57] ABSTRACT

Process for refining hydrocarbon feedstocks comprising contacting a hydrocarbon feedstock with zeolite-containing particles that are free-flowing, discrete, rounded, rigid, frangible, hollow, and opaque. The zeolite-containing particles are essentially completely decoked upon regeneration, and then retain their catalytic activity even after several cycles of use-regeneration.

14 Claims, 2 Drawing Figures

PROCESS FOR CATALYTIC CONVERSION OF HYDROCARBON FEEDSTOCK

This is a continuation of application Ser. No. 683,699 filed Dec. 19, 1984, now abandoned, which is a division of application Ser. No. 489,256 filed Apr. 27, 1983 now U.S. Pat. No. 4,546,090.

This invention relates to hollow, zeolite-containing particles and to the use of such particles as catalysts in processes for refining of hydrocarbon feedstock to produce hydrocarbons having lower boiling points and lower molecular weights than the feedstock.

Both natural and synthetic zeolites have been shown to be useful as catalysts in petroleum refining processes. These processes include isomerizing paraffins and naphthenes, isomerizing polyalkyl-substituted aromatics, disproportionating aromatics, reforming, and alkylation.

Certain zeolites are used as catalysts in processes for the conversion of petroleum feedstocks to materials having lower molecular weights and lower boiling points than the feedstocks, which materials are of greater economic value than the feedstocks. These processes are commonly referred to as cracking processes. A major deficiency of zeolite catalysts is the deactivation of such catalysts resulting from the formation and deposition of carbon and carbonaceous materials onto the surface of the catalyst. This phenomenon is referred to as "coking". Coking seriously impairs catalyst efficiency for the principal reaction desired and substantially decreases the rate of conversion and selectivity of the process. Thus, the coked zeolite catalyst must be periodically or continually regenerated, i.e., restored to approach original strength or properties. Coked catalysts are normally regenerated by controlled heating or burning in the presence of an oxygen-containing gas, such as air. Coke which builds upon the catalyst during the cracking cycle and remains after regeneration—the so-called carbon-on-regenerated catalyst (CRC)—has been shown to affect product yields adversely. The CRC is a result of initial carbon deposition during the cracking cycle from the aforementioned coke sources. The current industry trend is to lower CRC as much as possible to improve product yield Accordingly, it would be desirable to employ a zeolite-containing catalyst which avoids or minimizes the effects of carbon-on-regenerated catalyst It has been found that the hollow, zeolite-containing particles, useful as refining catalysts in this invention, are essentially completely de-coked upon regeneration, i.e., they have essentially no carbon deposits visible to the unaided eye upon regeneration, whereas current zeolite-containing catalysts used under the same or similar refining and regenerating conditions have visible carbon deposits upon regeneration Furthermore, the zeolite-containing catalysts of this invention retain their catalytic activity even after several cycles of use-regeneration.

Although numerous zeolite-containing catalysts have been disclosed in the prior art, none are capable of being as effectively restored in appearance and activity, after regeneration, as is the catalyst of the present invention.

The catalyst of this invention is a hollow particle having a solid peripheral wall or shell that defines and encloses a hollow cavity, space, or void within the interior of the particle. The wall or shell is a composite structure comprising (1) an inorganic matrix material, such as clay or amorphous silica-alumina hydrogel or both, and (2) zeolite promoters, i.e., stabilized, crystallizine alumino silicates, such as faujasite. It is preferred that the particle have a single hollow, interior space; however, the interior space may be divided into a number of cells by interior walls having essentially the same composition as the wall or shell. This particle exhibits essentially no visible residual carbon or carbonaceous material on its surface after its regeneration by standard de-coking operations As used in this application, the term "visible" means visible to the unaided eye. A mass of the particles are useful in processes for the conversion of petroleum hydrocarbons to lower molecular weight hydrocarbons of greater economic value. The preferred shape of the particle is a generally spheroidal shape having an outside diameter ranging from about 0.5 to about 20 mm. The thickness of the peripheral shell can range from about 2 to about 50 percent of the radius.

In the accompanying drawings

Figure 1:
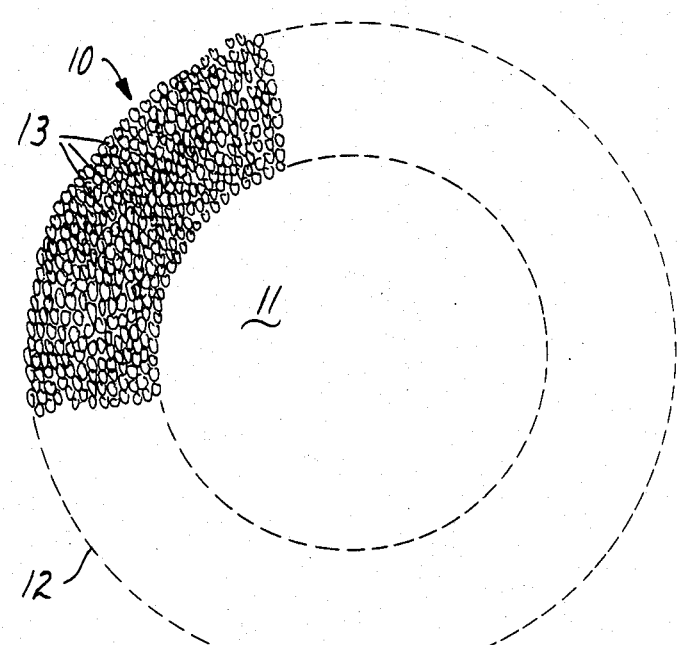
FIG. 1 is an enlarged cross-section through an illustrative zeolite-containing particle of the invention.

The hollow, zeolite-containing particles of this invention can be prepared from one or more conventional zeolite-containing materials. These conventional materials are well-known in the art.

Methods for preparation of (1) silica-alumina gel-based zeolite materials, (2) silica-magnesia gel-based zeolite materials, and (3) clay-based zeolite cracking catalysts are described in J. A. Rabo, *Zeolite Chemistry and Catalysis*, American Chemical Society (1976) (pp. 618–630). U.S. Pat. No. 3,650,988, incorporated herein by reference, discloses zeolite-containing catalysts, and methods for the preparation thereof, which are suitable for preparing the hollow particles of this invention.

Zeolite materials containing natural and synthetic zeolites, from which the hollow particles of this invention can be prepared, are commercially available. A commercially available material which is particularly useful for this invention is a silica-alumina gel-based zeolite material designated CBZ-1 (W. R. Grace and Co., New York, N.Y.). Several acceptable alternative zeolite-containing materials which can be used in this invention are listed in J. A. Rabo, *Zeolite Chemistry and Catalysis*, supra, p. 632; these include CBZ-2, CBZ-3, CBZ-4, XZ-25, XZ-36, XZ-40, all of which are silica-alumina gel-based zeolite materials available from W. R. Grace and Co.

Certain zeolite-containing materials are more advantageously employed in this invention due to certain physical or chemical characteristics, such as pore size, pore size distribution, and ability to catalyze acid-catalyzed reactions.

The particles of this invention preferably contain about 2 to about 50 percent, by weight, zeolite promoter the remainder being matrix material In describing the particles of this invention, the term "matrix material" means inorganic material in which the zeolite promoter is dispersed, and the term "zeolite promoter" or "zeolite" means stabilized crystalline alumino silicate that in small amounts is able to increase the catalytic activity, if any, of the matrix material These matrix materials include such minerals as silica, alumina, silica-alumina hydrogels, and mixtures thereof In addition to the silica and alumina materials, clay, such as kaolin, or chemically or thermally modified kaolin, can also be included with the matrix material as a diluent. The matrix material can also be selected from naturally occurring clays. Typical examples of naturally occurring clays include halloysite, kaolinite, montmorillonite, bentonite, and mixtures thereof. Matrices derived from silica, alumina, and silica-alumina materials exhibit high porosity; matrices derived from naturally occurring clays exhibit low porosity. In addition, the matrix material can also contain minor amounts, e.g., less than 50 percent by weight of the matrix material, of other inorganic metal oxides such as magnesia, zirconia and the like. Other fillers, such as glass and fly ash, can also be included in the matrix material. Such fillers must not have an adverse effect on the zeolite promoter. Zeolite promoters include natural zeolites, such as, for example, faujasite, and synthetic zeolites, such as, for example, X-type synthetic faujasite, Y-type synthetic faujasite, and rare-earth ion-exchanged X-type synthetic faujasite, and rare-earth ion-exchanged Y-type synthetic faujasite.

The zeolite-containing particles of the present invention are free-flowing, discrete, rounded, rigid, frangible, hollow particles or nodules, the shell or wall of each being porous to fluids and opaque. The hollow, central void, or interior within the particles can be filled with liquid, air, or other gas, and is not evacuated. Normally, the hollow interior will be filled with the ambient atmosphere, which usually will be air. The surface of the wall or shell may range from smooth to the nature of orange-peel. As used in this application, the term "smooth" means having a surface essentially free of points, bumps, ridges, bits or other discontinuities. A particle shell or wall characterized herein as "porous" is one whose wall has interconnected microscopic pores or passages and is permeable to liquid or gas or both. An "opaque" shell or wall is one which does not transmit visible light such that the outline, periphery, or edges of bodies beneath and in contact with the shell will be discernible. A "frangible" particle is one which is capable of being broken The preferred embodiments of the particles of the present invention are generally spherical in shape. A particle characterized herein as "spherical" unless otherwise indicated is one which has the shape of a true sphere or of a spheroid, that is, like a sphere, e.g. oblate or prolate. Spherical-shaped zeolite-containing particles are preferable because it is easy to control their size, strength, thermal stability, and uniformity. Such a shape results in more uniform packing of a mass or bed of the particles and minimization of channeling, thus allowing more efficient contact between reactants and catalyst.

In a particularly preferred embodiment of the present invention, the hollow, spherical zeolite-containing particles have an outside diameter of about 2 to about 8 mm, preferably about 3 to about 4 mm, and have a wall or shell thickness of about 0.2 to about 0.8 mm, preferably about 0.5 mm. It should be understood, however, that hollow particles of other diameters (and different wall thickness) can be used as catalysts in this invention. The particular diameter and wall thickness depends upon the nature of the process in which the particles are to be used, e.g., as a catalyst in a fixed bed, moving bed, fluidized bed, or other process. The hollow, zeolite-containing particles of this invention can have shapes other than spherical. For example, they can be in the shape of hollow pillows, as described in Harrison, U.S. Pat. No. 4,110,499. They can also be in the shape of cylinders, ellipsoids, or the like.

Referring now to FIG. 1, the illustrative hollow particles 10 of the invention preferably have a single hollow interior space, such as the space 11, enclosed by a single wall or shell 12. The wall or shell 12 comprises zeolite promoter and matrix material 13. In less preferred embodiments, the interior space 11 of the particle may be divided into a number of cells by interior walls having essentially the same composition as the exterior wall; but even such particles have an exterior wall 12, usually of rather constant thickness and of greater density than the interior walls, around the interior space. The exterior wall 12 is continuous, and it is usually permeable or porous. The thickness of the exterior wall 12 is generally less than about 50 percent of the radius of the sphere and can be quite thin. For example, the wall thickness can be as thin as 2 percent of the radius of the sphere.

The hollow, zeolite-containing particles of the present invention can be formed by the method described in U.S. Pat. No. 4,111,713, incorporated herein by reference for that description. Other methods, such as spray drying and solvent extraction, can also be used to prepare the hollow catalysts of this invention.

The method disclosed in U.S. Pat. No. 4,111,713 involves the following sequence of steps:

(A) A finely powdered zeolite-containing material is thoroughly mixed with liquid temporary binder material that includes a volatile void-forming agent adapted to evolve as a gas which will convert droplets of the mixture to a hollow condition upon volatilization. During mixing, the powdered zeolite-containing particles are wetted by, and at least partially absorbed into, the liquid temporary binder;

(B) The mixture in (A) is added dropwise to a tumbling chamber which includes a rolling bed containing additional finely powdered particulate material. The particulate material can be (1) zeolite-containing particles of the type used in the mixture in step (A), (2) zeolite promoter particles, (3) particles of inorganic matrix material, or (4) particles of other materials which impart desirable processing properties to the powdered material in the rolling bed;

(C) The tumbling chamber is heated from ambient temperature up to such a temperature and at such a rate, e.g., up to about 150° C. over a period of one to three minutes, so that the volatile void-forming agent can convert the liquid droplets, or globules, formed in step (B) to a hollow condition and for the converted globules to solidify as hollow particles; and (D) The hollow particles are removed from the chamber by sifting through a screen, and are then fired under conditions of temperature and time so that the solidified temporary binder material decomposes and burns off, and the matrix material fuses. The resulting hollow particle then consists of inorganic material only.

The hollow particles formed by this method have an outside diameter of about 20 millimeters or less. The smallest outside diameters are generally no less than 0.5 millimeter. The particles are characterized by having a solidified peripheral wall or shell that defines and encloses a hollow space within the interior of the shell. The peripheral wall of the individual shell is a composite structure that comprises particles of zeolite promoter held or bound by inorganic matrix material.

In a hollow particle of the invention, as formed at the end of the particle-forming operation and fusing of the matrix material, the peripheral wall of the particle will generally comprise only a single layer or thickness of the matrix material, with zeolite promoter particles dispersed in the matrix material. There may be a gradation in the composition of the layer from the inside surface to the outside surface of the wall; and there may be pigments or other fillers contained in the matrix material as a discontinuous phase or dispersion.

The particular chemical composition of the matrix material can vary. It is, however, necessary that the matrix material employed be thermally stable under the conditions at which the hydrocarbon conversion is to be conducted. The matrix material can be catalytically inert or active.

Tumbling chambers suitable for preparing the hollow particles of this invention are described in U.S. Pat. No. 4,111,713. The chamber can be a cylindrical container which rotates about its cylindrical axis. The cylindrical container is generally heated, as by gas flame, to melt solid temporary binder granules to a liquid globule form. Heat may also be used to maintain a desired viscosity, to activate blowing agent within the binder granules, to evaporate solvent, or the like. The chamber can be a conical pan which rotates about its conical axis. The chamber can be a spherical flask equipped with a tubular inlet. The flask is filled with a mixture of powdered zeolite particles and globules of temporary binder material, after which the flask is closed and attached to a shaft which rotates the flask about the axis of the tubular inlet.

Illustrative temporary binder materials suitable for this invention include epoxy resins, polycarbodiimides, formaldehyde resins such as phenol-formaldehydes, urea-formaldehydes, and melamine-formaldehydes, polyesters, polyisocyanurates, polyurethanes, natural rubber and synthetic elastomers, such as silicones, styrene-butadiene copolymers, chloroprenes, acrylonitrile-butadiene copolymers, acrylic resins, ethylene copolymers such as ethylene-vinyl acetate copolymers, propylene copolymers such as ethylene-propylene copolymers, cellulosic derivatives, such as ethyl hydroxyethyl cellulose, olefin-wax combinations, and polyolefin-wax combinations. These temporary binders serve as a carrier into which zeolite powders and other powders can be added. The temporary binders can provide the void-forming agent when they are heated in the rolling bed, and they hold the hollow, zeolite-containing spheres intact after formation by blowing. The temporary binders are decomposed and burned off in the firing step to produce a structure entirely composed of inorganic material.

The void-forming agent used to form hollow particles of the invention can be any substance which, while present in the binder material, evolves as a gas during the time and at the temperature of formation of the hollow particles. It can be a separate ingredient added to the binder material; it can be a by-product of reaction of the binder material; or it can be a solvent or carrier for the binder material. The void-forming agent can be incorporated into the binder material while the latter is in liquid form prior to being solidified and formed into the hollow spheres In other cases it can be mixed with milled solid binder material which is then spray-dried or compressed or otherwise prepared into the hollow particles.

Generally, the void-forming agent causes an expansion in size of the liquid droplets being formed into hollow particles, since at least initially the outer wall of the droplet tends to retain evolved gas. Sufficient void-forming agent should be provided to form voids of the desired size. Examples of useful void-forming agents are, in the case of a temporary binder such as a phenol-formaldehyde resin, the water reaction byproduct produced during curing of the resin; in the case of some elastomers, the agent is a solvent for the elastomer precursor; in the case of low-melting glass, the agent is water from hydrated borate or water contained in other "slip" particles; and in the case of a slurry of clay or other inorganic powders, the agent is water or other slurry-forming medium.

The globules of binder material introduced into the hollow particle-forming apparatus, i.e., the tumbling chamber, can vary in size depending upon the size of hollow sphere that is ultimately desired. Typically, the globules will range in size from about 100 micrometers to 1 centimeter in diameter, and most often will be less than 5 millimeters in diameter Generally binder material globules having such a range of sizes will produce hollow particles having an outside diameter ranging from about 0.5 millimeter to about 20 millimeters. Particles having good uniformity of sizes can be made by using binder material globules of uniform size. Of course, the hollow particles can be separated after formation to provide desired ranges of sizes.

The hollow, zeolite-containing particles of the present invention can be used to catalyze various petroleum conversion reactions, e.g., cracking, hydrocracking, reforming, isomerization, disproportionation, alkylation, hydrogenation and the like. The catalysts can also be used to catalyze liquified coal conversion reactions. As a result of hydrocarbon conversion, at least a portion of the hydrocarbon feed is chemically converted to different, and more valuable products. The catalyst of the present invention is capable of converting petroleum hydrocarbons such as gas oil, which has a boiling point (b.p.) range of 290°–510° C. (550°–950° F.), to lower molecular weight derivatives which are of greater economic value, such as gasoline.

A hydrocarbon conversion process which is contemplated for use with the hollow particles of the present invention involves contacting a gas oil with the catalyst under elevated temperatures, and, where desirable, elevated pressures in air or in an inert atmosphere. The ability to be physically stable under high temperatures is extremely important for a catalyst which is to be used for converting gas oil to derivatives of lower molecular weight.

The hollow, zeolite-containing particles of the present invention can be regenerated and rendered colorless and essentially completely coke-free, i.e., visibly free of carbonaceous products, after standard de-coking operations. This characteristic is in contrast to zeolite-containing catalysts in current use, which remain visibly coked under identical de-coking conditions. As a result of their unique construction, the hollow particles of this invention do not exhibit carbon-on-regenerated catalyst as do conventional zeolite-containing catalysts, and they have a longer useful life compared to conventional zeolite-containing catalysts.

A type of refining process where the hollow shells of this invention can be used as catalysts is catalytic cracking of hydrocarbons. Reaction conditions for the catalytic cracking process will depend on the specific type of cracking process employed, i.e., fixed bed, moving bed, or fluidized bed, the nature of the feedstock, e.g., whether the feedstock is highly paraffinic or aromatic, and the particular products desired and the yield thereof. Temperature, pressure, and liquid hourly space velocity are critical for determining the particular products and their yield.

The cracking reaction can be carried out at pressures ranging from subatmospheric up to about several atmospheres or more. Preferably, the pressure at which the reaction is conducted will range from atmospheric to about $6.89 \times 10^5$ Pa (100 psig), and more preferably, from atmospheric to about $1.38 \times 10^5$ Pa (20 psig). The catalytic cracking reaction is generally carried out in the essential absence of added free molecular hydrogen.

The liquid hourly space velocity for catalytic cracking is preferably maintained within the range of from about 0.5 to about 20, more preferably from about 1 to about 5.

The catalyst-to-oil feedstock ratio is preferably maintained at from about 1/1 to about 20/1 on a weight basis, preferably at from about 2/1 to about 10/1. The catalyst-to-oil feedstock ratio depends on the type of process used, i.e., fluidized bed, moving bed, or fixed bed. Generally, higher catalyst-to-oil feedstock ratios are used for fluidized bed operations. Increasing the catalyst to oil feedstock ratio normally reduces the extent of catalyst deactivation from coke production, and increases the conversion of the feed to lower boiling products.

The following example is included to illustrate the present invention.

EXAMPLE I

This example illustrates the catalytic effects of hollow, spherical zeolite-containing particles of this invention.

Figure 2:
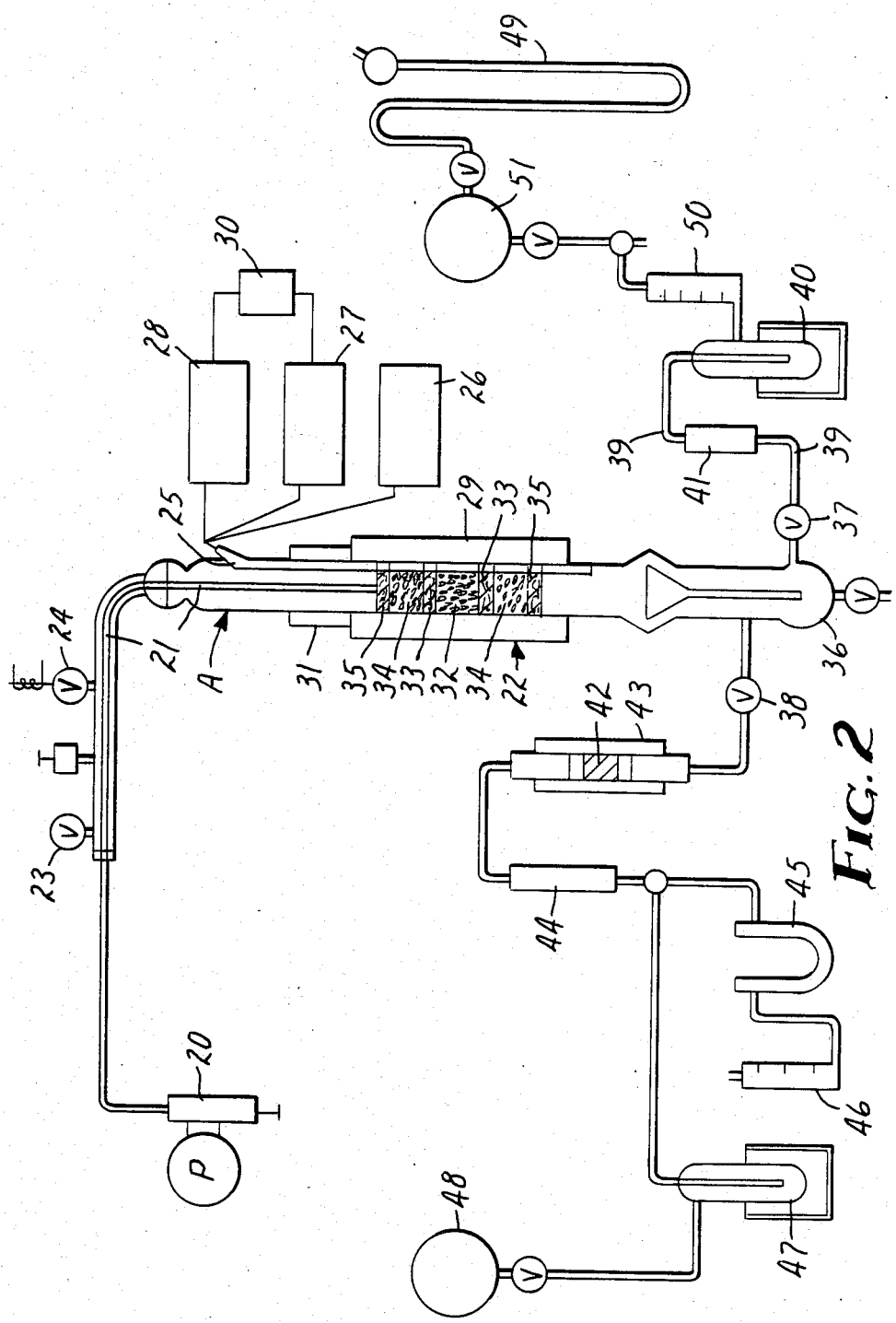
FIG. 2 is a schematic diagram of illustrative apparatus for the evaluation of the particle of the invention as catalyst for a refining process.

A test method was devised to show that the hollow, spherical zeolite-containing particles of the present invention are useful as catalysts in the cracking process for converting conventional petroleum feedstocks to more economically desirable hydrocarbon fractions. This test method was also used to demonstrate that these catalysts can be regenerated to give active, visibly carbon-free catalysts exhibiting a low attrition rate when compared with zeolite catalysts in current use. In this test method, hollow zeolite-containing particles are evaluated as a cracking catalyst by deactivating the particles, before data are taken, to a level which simulates refinery conditions. This is done by repeating catalytic cracking runs in a cracking apparatus modeled after that described in Ind. Eng. Chem. Prod. Res. Dev. 16, N. Y. Chen, W. P. Burgess and R. H. Daniels, 242 (1977). FIG. 2 illustrates an automated cracking apparatus. The figure is classified into three sections for ease of description.

Section 1 of FIG. 2 is comprised of a cylindrical cracking unit A which contains a motorized pump P which pumps feedstock from a syringe 20 through the feedstock inlet 21 and into the catalyst bed 22, which is described below. Inlet valve 23, which is controlled by a solenoid switch, allows introduction of inert helium to exclude air before the beginning of the cracking process. Inlet valve 24, which is also controlled by a solenoid switch, allows introduction of air for regeneration or de-coking between cracking cycles. The cracking unit also has a thermocouple well 25 into which are positioned leads for a recorder 26, a 482° C. (900° F.) controller 27, and a 704° C. (1300° F.) controller 28 for furnace 29; both controllers are connected to junction box 30. Preheater 31 is controlled by a variable transformer (not shown).

The catalyst bed 22 is comprised of a central catalyst-containing zone 32 of 7 cm in length and 2.5 cm in diameter for a catalyst volume of up to 34 cc. The size of the catalyst bed, and that of the cracking apparatus, can be varied so long as the liquid hourly space velocity is maintained within the required range. Both above and below the catalyst-containing zone 32 are placed, in succession, a layer of quartz wool 33, a layer of quartz chips 34, and a second layer of quartz wool 35.

At the bottom of the cracking unit is a trap 36 to condense high boiling liquids. Connected to trap 36 are two outlet valves 37 and 38, both controlled by solenoid switches. By proper operation of these valves, low boiling liquids and liquids that are gases at room temperature can be made to pass through valve 37, then through connecting line 39 to condense into trap 40 by means of an external coolant such as liquid nitrogen. To ensure complete passage of low boiling liquids into trap 40, line 39 is heated by heater 41, which is controlled by a variable transformer (not shown).

The cracking sequence is begun by opening the line 39 to trap 40 by opening valve 37. Air is passed through the cracking unit by opening valve 24. Column controller 27 is set for a cracking temperature of 482° C. (900° F.). Preheater 31 is set at 427° C. (800° F.). Conversion heater 43, used to convert carbon monoxide to carbon dioxide, is set at 600° C. (1112° F.) and the system is held at these settings until the heating units reach their respective operating temperatures. The air is then turned off by closing valve 24, and helium is introduced by opening valve 23, thereby purging the system. After purging, valve 23 is closed and pump P is activated to drip feedstock from syringe 20 down onto the catalyst-containing zone 32 of the cracking unit.

During the regeneration (de-coking) phase of the cracking process the furnace 29 is brought to 704° C. (1300° F.). Valve 38, located at the second outlet above trap 36 of the cracking unit, is opened, while valve 37 is closed. Air is purged through the unit by opening inlet valve 24.

During de-coking, oxidized gases in air pass through a copper oxide packed tube 42, surrounded by conversion heater 43 which is controlled at 600° C. (1112° F.) by a variable transformer and enter into what is classified as Section 2 of the cracking apparatus, the carbon dioxide measuring section, described below.

Gases pass through drying tube 44, which contains anhydrous calcium sulfate (Drierite ®, commercially available from W. A. Hammond Drierite Co., Xenia, Ohio), and into a pre-weighed U-shaped tube 45 containing asbestos coated with sodium hydroxide (Ascarite ®, commercially available from A. H. Thomas Co., Philadelphia, Pa.). Air exits through flowmeter 46. The amount of material de-coked can be calculated from the weight of carbon dioxide absorbed in tube 45. Alternatively, the carbon dioxide may be measured manometrically by condensing it into trap 47 by means of external cooling, and then volatizing the condensate and expanding the gas into gas collection bulb 48 which can be connected through a valve (not shown) to manometer 49 for measurement.

Section 3 in FIG. 2 is concerned with the measurement and analysis of cracked products and utilizes a manometric method for determining the amount of low boiling hydrocarbons generated in the cracking process. The low boiling hydrocarbons are gases at room temperature. Volatile components condensed in trap 40 are permitted to boil off and pass through flowmeter 50 into gas collection bulb 51, which in turn is connected to manometer 49.

Means for controlling all electrical circuits, timing operations, and feedstock and gas flow rates to assure reproducible conditions are provided by a microprocessor (not shown). Such a microprocessor is commercially available from Texas Instruments, Inc., Dallas, Tex. The microprocessor allows for continuous essentially unattended, automated operations.

In order to prepare the hollow, zeolite-containing particles, twenty grams of finely powdered zeolite-containing particles, obtained by grinding a commercially available catalyst, CBZ-1 (W. R. Grace & Co., New York, N.Y.), were mixed with 35 cc of 2-butanone (methyl ethyl ketone) and 5 g of ethyl hydroxyethylcellulose (commercially available from Hercules, Inc., Wilmington, Del.) to form a slurry. This slurry was then added dropwise into a tumbling, rolling bed containing the same type powdered zeolite-containing particles as contained in the slurry. The bed was subsequently heated from ambient temperature up to 150° C. (300° F.) over a period of time of about three minutes to cause the added droplets, or globules, to "blow", i.e., expand and harden as hollow shells, generally spherical in shape. Hollow particles having an external diameter of 3-4 mm were separated from fine particulate material by means of a screen. The hollow particles were then fired at about 600° C. (1112° F.) for one hour. The firing step caused the solidified ethyl hydroxyethylcellulose to burn off, leaving a product consisting entirely of inorganic material. The particles were opaque and white in color.

The hollow, zeolite-containing particles (7.6 g, 23 cc) made as described above were packed into the catalyst-containing zone 32 of the cracking unit of FIG. 2. Liquid nitrogen was placed in a suitable vessel surrounding trap 40 and the cracking sequence, to be described below, was started.

The cracking catalyst was deactivated to a level which simulated refinery conditions by running the system through 30 conditioning cycles before data were taken.

The following cracking sequence was performed in a typical cycle through use of the microprocessor:

The line 39 to trap 40 was opened by opening valve 37. Air was passed at the rate of 55 cc/min through the cracking unit by opening valve 24. Column controller 27 was set for a cracking temperature of 482° C. (900° F.). Preheater 31 was set at 427° C. (800° F.). Conversion heater 43, used to convert carbon monoxide to carbon dioxide, was set at 600° C. (1112° F.) and the system was held at these settings until the heating units reached their respective operating temperatures. This holding period was about one hour. The air was then turned off by closing valve 24, and helium was introduced at a flow rate of 16 cc/min by opening valve 23, thereby purging the system. The purge operation consumed about 3 minutes. After purging, valve 23 was closed and the pump was activated to drip gas oil feedstock from syringe 20 down onto the catalyst-containing zone 32 of the catalyst bed 22. Canadian vacuum gas oil [3.75 g, b.p. 343° C. (650° F.), commercially available from Allied Oil Co., a Division of Ashland Oil, Inc., St. Paul Park, Minn.] was used as the feedstock. The catalyst to feedstock ratio was 2/1. The pump was then turned off, and the resultant pressure generated was allowed to subside. The pressure subsided to the proper level in about 7 minutes. Helium was admitted for about 5 minutes through valve 23, and the temperature of furnace 29 was raised to 704° C. (1300° F.) by means of column controller 28. After a delay of 20 minutes, line 39 was heated for 10 minutes to volatilize any liquid caught between trap 36 and trap 40. At this point, the regeneration, or de-coking, phase of the sequence was begun. The line to conversion heater 43 was opened by opening valve 38, closing valve 37, and opening the air line through valve 24 and closing the helium line through valve 23. The admission of air allowed the de-coking of the catalyst and conversion of coked products to carbon dioxide. After the regeneration phase, which consumed about one hour, the temperature of furnace 29 was allowed to drop to the cracking temperature (482° C., 900° F.). After a 30 minute delay, the lines to traps 36 and 40 were opened through valve 37, while the line to the conversion heater 43 was closed through valve 38. The cracking unit was then placed into the standby mode by closing valve 24. The results of the cracking/regeneration sequence are shown in Table I.

COMPARATIVE EXAMPLE A

This example illustrates the catalytic effects of a solid zeolite-containing catalyst in the form of beads.

Commercial CBZ-1 catalyst as used in Example I was converted to solid spheres according to the method of U.S. Pat. No. 4,111,713, with the difference indicated below.

Twenty grams of finely powdered zeolite-containing particles catalyst, obtained by grinding the commercially available catalyst CBZ-1, were mixed with 35 cc of 2-butanone (methyl ethyl ketone) and 5 g of ethyl hydroxyethylcellulose (commercially available from Hercules, Inc., Wilmington, Del.) to form a slurry This slurry was then added dropwise into a tumbling, rolling bed containing the same type powdered zeolite-containing particles as contained in the slurry The bed was subsequently heated from ambient temperature up to 150° C. (300° F.) over a period of time of about five minutes to allow the droplets in the tumbling mixture to harden into solid beads The rate of heating was controlled so that the droplets did not expand. If the droplets were to expand, the solid product would not be obtained, and instead, the hollow product of this invention would be obtained The solid beads were then separated from fine particulate material by means of a screen. The beads were fired at 600° C. (1112° F.) for one hour As in Example I, the ethyl hydroxyethylcellulose was burned off in the firing step, leaving a product consisting entirely of inorganic material. The beads were white in color The zeolite-containing solid beads (11.2 g, 23 cc) made as described above were packed into the catalyst-containing zone 32 of the catalyst bed 22 and the catalyst was deactivated to simulate refinery conditions by performing 10 conditioning cycles before data were taken The cracking/regenerating sequence as described in Example I was conducted, and the results are shown in Table I.

COMPARATIVE EXAMPLE B

This example illustrates the catalytic effects of a conventional zeolite-containing material in solid particulate form.

Fifteen grams (23 cc) of the commercial fluidized cracking catalyst CBZ-1 was packed into the catalyst-containing zone 32 of the catalyst bed 22 shown in FIG. 2, described previously. The catalyst particles were white in color.

The catalyst was deactivated to simulate refinery conditions by performing 30 conditioning cycles before data were taken. The cracking sequence described in Example I was followed, and the results are shown in Table I.

TABLE I

| | | | | | | Catalytic Cracking of Feedstock$^a$ | | | | |
|---|---|---|---|---|---|---|---|---|---|---|
| | Catalyst | | | Gas Oil | | | Fractions | | | |
| Ex. No. | Physical form | Weight (g) | Volume (cc) | Color after de-coking | Weight (g) | Weight per hour (g/hr) | Gases$^b$ (%) | Low boiling liquids$^c$ (%) | High boiling liquids$^d$ (%) | Carbon recovered$^e$ (%) | Yield$^f$ (%) |
| I | Hollow Particles (Invention) | 7.6 | 23 | White | 3.75 | 30 | 20 | 8 | 38 | 11 | 77 |
| A | Solid Beads | 11.2 | 23 | Grey to Black | 5.75 | 31 | 13 | 5 | 44 | 7 | 70 |
| B | FCC$^g$ (Control) | 15 | 23 | Grey to Black | 7.5 | 30 | 22 | 13 | 33 | 6 | 74 |

$^a$Canadian vacuum gas oil, b.p. up to 343° C. (650° F.), commercially available from Allied Oil Co., a Division of Ashland Oil, Inc., St. Paul Park, MN.
$^b$Condensed in liquid nitrogen; gas at 25° C.
$^c$Condensed in liquid nitrogen; liquid at 25° C.
$^d$Condensed 25° C.
$^e$Determined gravimetrically by conversion of coke to carbon dioxide, which is trapped in pre-weighed tubes containing Ascarite ® NaOH-coated asbestos; Ascarite ® is commercially available from A. H. Thomas Co., Philadelphia, PA. The percent value indicated is equal to [(grams of carbon recovered by decoking/grams of feedstock) × 100%].
$^f$The percent value indicated is equal to [(grams of gases + grams of low boiling liquids + grams of high boiling liquids + grams of carbon recovered)/(grams of starting material) × 100%].
$^g$FCC is state of the art fluidized cracking catalyst "CBZ-1", commercially available from W. R. Grace and Co., New York, NY.

Infrared analysis and gas chromatographic analysis showed that the fractionated products were similar when using the hollow particles of the present invention, the catalyst in the form of solid beads, and the untreated commercial cracking catalyst.

Table I shows that the color of the hollow particles of the invention were white in color after de-coking (thus essentially completely regenerated), whereas the color of the state of the art fluidized cracking catalyst (CBZ-1) and the solid beads made from CBZ-1 were grey to black in color after de-coking. In addition, Table I shows that the percentage of carbon recovered from the system wherein the hollow particles of the present invention were employed exceeded the percentage of carbon recovered from the systems employing the untreated fluidized cracking catalyst CBZ-1 or the solid beads made therefrom. Thus, one can conclude that the catalyst system of the present invention retains a lower percentage of carbon after the use-regeneration cycle than do catalyst systems in current use. Further, the employment of hollow particles does not result in any greater percentage loss of starting material, i.e., feedstock, than does the employment of catalytic materials in conventional form.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. In a process for the catalytic cracking of a hydrocarbon feedstock comprising contacting said hydrocarbon feedstock with a zeolite-containing catalyst, the improvement wherein the catalyst comprises hollow particles comprising a solidified peripheral shell that defines and encloses a hollow space within the interior of said shell, said peripheral shell being a composite structure that comprises a zeolite dispersed in inorganic matrix material, said particles being capable of being essentially completely de-coked upon regeneration, whereby said hydrocarbon feedstock is chemically converted to lower boiling hydrocarbons.

2. The process of claim 1 wherein catalytic cracking is conducted in a fixed bed.

3. The process of claim 1 wherein catalytic cracking is conducted in a fluidized bed.

4. The process of claim 1 wherein catalytic cracking is conducted in a moving bed.

5. The process of claim 1 wherein the feedstock to said catalytic cracking process is liquified coal.

6. The process of claim 1 wherein said particles are in the form of spheres or spheroids.

7. The process of claim 1 wherein said particles have an outside diameter ranging from about 0.5 to about 20 millimeters.

8. The process of claim 1 wherein the shell has a thickness of about 0.5 to about 0.02 times the radius of the hollow particle.

9. The process of claim 1 wherein the matrix material comprises from about 50 to about 98 percent by weight of the shell and the zeolite promoter comprises from about 2 to about 50 percent by weight of the shell.

10. In a process for the catalytic cracking of gas oil having a boiling point range of 290° C. to 510° C. comprising contacting said gas oil with a zeolite-containing catalyst, the improvement wherein the catalyst comprises hollow particles comprising a solidified peripheral shell that defines and encloses a hollow space within the interior of said shell, said peripheral shell being a composite structure that comprises a zeolite dispersed in inorganic matrix material, said particles being capable of being essentially completely de-coked upon regeneration, whereby at least a portion of said gas oil is chemically converted to gasoline.

11. The process of claim 10 wherein the process is conducted at a pressure which ranges from atmospheric to about $6.89 \times 10^5$ $P_a$.

12. The process of claim 10 wherein the process is conducted at a liquid hourly space velocity which is maintained within the range of from about 0.5 to about 20.

13. The process of claim 10 wherein the process is conducted at a catalyst-to-oil feedstock ratio which is maintained at from about 1/1 to about 20/1 on a weight basis.

14. The process of claim 10 wherein the process is conducted at a temperature which is at least 482° C.

* * * * *

UNITED STATES PATENT AND TRADEMARK OFFICE
CERTIFICATE OF CORRECTION

PATENT NO. : 4,663,024

DATED : May 5, 1987

INVENTOR(S) : Paul B. Olson, Richard M. Minday and Julian B. Cooley

It is certified that error appears in the above-identified patent and that said Letters Patent is hereby corrected as shown below:

Col. 2, line 60, "material In" should read --material. In--

Col. 2, line 68, "thereof In" should read --thereof. In--

Col. 5, line 62, "spheres In" should read --spheres. In--

Col. 10, line 38, "slurry This" should read --slurry. This--

Col. 10, line 41, "slurry The" should read --slurry. The--

Col. 10, line 52, "hour As" should read --hour. As--

Col. 10, line 56, "in color" should read --in color.--

Col. 10, line 61, "taken The" should read --taken. The--

Signed and Sealed this

First Day of September, 1987

*Attest:*

DONALD J. QUIGG

*Attesting Officer*  *Commissioner of Patents and Trademarks*